(12) United States Patent
Frischman et al.

(10) Patent No.: US 9,377,302 B2
(45) Date of Patent: Jun. 28, 2016

(54) DISTANCE FINDER APPARATUS AND SYSTEM

(71) Applicants: Mark Frischman, Thornhill (CA); Bruce Kenneth Clifford, Brampton (CA); Adam Samuel Ward, New Orleans, LA (US)

(72) Inventors: Mark Frischman, Thornhill (CA); Bruce Kenneth Clifford, Brampton (CA); Adam Samuel Ward, New Orleans, LA (US)

(73) Assignee: Multiwave Sensors Inc. (CA)

( * ) Notice: Subject to any disclaimer, the term of this patent is extended or adjusted under 35 U.S.C. 154(b) by 75 days.

(21) Appl. No.: 14/055,673

(22) Filed: Oct. 16, 2013

(65) Prior Publication Data

US 2014/0104591 A1  Apr. 17, 2014

Related U.S. Application Data

(60) Provisional application No. 61/714,432, filed on Oct. 16, 2012.

(51) Int. Cl.
| | |
|---|---|
| G01C 3/08 | (2006.01) |
| G02B 3/06 | (2006.01) |
| G02B 5/32 | (2006.01) |
| G01S 17/48 | (2006.01) |
| G01S 7/481 | (2006.01) |
| G01S 7/51 | (2006.01) |
| G02B 27/20 | (2006.01) |

(52) U.S. Cl.
CPC ............... *G01C 3/08* (2013.01); *G01S 7/4813* (2013.01); *G01S 7/4814* (2013.01); *G01S 7/51* (2013.01); *G01S 17/48* (2013.01); *G02B 3/06* (2013.01); *G02B 5/32* (2013.01); *G02B 27/20* (2013.01)

(58) Field of Classification Search
CPC .......... G01S 17/875; G01S 7/499; G01C 3/08
See application file for complete search history.

(56) References Cited

U.S. PATENT DOCUMENTS

| | | | | |
|---|---|---|---|---|
| 2007/0149882 | A1* | 6/2007 | Wedel | 600/476 |
| 2009/0185157 | A1* | 7/2009 | Imamura | 356/3.01 |
| 2013/0003037 | A1* | 1/2013 | Nau | 356/3.01 |

* cited by examiner

*Primary Examiner* — Luke Ratcliffe
(74) *Attorney, Agent, or Firm* — Eugene Ja Gierczak; Eduardo Krupnik

(57) ABSTRACT

The present invention is a distance finder apparatus and system operable to project a laser beam spread in a line across a plane, and to determine the distance between a lens and objects that points of the spread laser beam contacts. The present invention comprises: a rangefinder incorporating an optical plate operable to cause an invisible laser beam to be spread, and a visible laser beam to be scattered, in a line along a plane, and the rangefinder is operable to measure distances at points where beams contact one or more objects; a visible pointer laser; and one or more display units. Locations where the spread beam contacts the one or more objects may be at variant distances, and measurements may be determined at any point along the scattered beam.

20 Claims, 12 Drawing Sheets

DISTANCE FINDER APPARATUS AND SYSTEM

This application claims the benefit of U.S. Provisional Patent Application Ser. No. 61/714432 filed Oct. 16, 2012.

FIELD OF INVENTION

This invention relates in general to the field of distance finder systems and more particularly to laser beam directed distance finder systems.

BACKGROUND OF THE INVENTION

Distance finder systems of several varieties that are directed to use for a number of purposes have been developed. Some of these prior art systems incorporate a laser beam that is utilized to determine and measure distances. Such prior art systems incorporate a narrow laser beam that is directed to a discrete point and the system is operable to determine a measurement to the location where the discrete point of the laser beam meets a surface, such as a wall.

Prior art distance finder systems further integrate a lens when such systems are utilized to determine distances prior to the capture of either still or motion images by a camera. For example, a distance finder may be positioned parallel to a camera lens that is a long lens. The field of view of a long lens is limited and such lenses are routinely utilized to capture close-up images in which a single item, person or other feature fills, or nearly fills the frame of the image. In such prior art systems the laser is aimed at the center of the frame in tandem and virtually parallel to the camera lens. The narrow laser beam hits a discrete point directly in front of the camera lens and a measurement reading is determined based upon that discrete point.

Such prior art systems incorporate a means whereby the measurement is made available to a user of the system, such as a screen incorporated in the apparatus that houses the laser beam and that is attachable to the camera. The screen is operable to show the measurement in a form that is readable by a user.

An example of a prior art system is the Cfinder™ system that is an optical distance measurement tool that incorporates an invisible class 1 laser for distance measurements and a visible class 2 laser as a pointer. The system can be utilized to focus on a small point on a target object during filming by way of the invisible laser, causing the measurement stream to be invisible. In this manner the Cfinder system can be utilized to measure the distance to a particular object. The visible laser can be utilized to show as a visible red dot the point on the target object where the laser beam is focused for the purpose of undertaking the distance measurement. The Cfinder system is part of the Cmotion™ system that further incorporates Cfocus™ that is focus assistance software. Cfocus provides a user with information by way of a display that is a measurement of the distance to a subject. The Cfinder component is attachable to a camera or may be mounted on a tripod. The Cfinder is solely operable to measure distance to the point where the laser beam contacts the target object.

The Cine Tape Measure™ is another example of a prior art distance measurement system utilized with a camera. This is an ultrasonic system that continuously measures the distance between a subject and a point on the film-plane through the use of ultrasonic waves. The measurements can be utilized to focus the camera lens in relation to the discrete point on the film-plane during the capture of an image. The invention is only operable to determine measurements to a discrete point on a target object.

Cinetape Extension Tubes™ may further be attached to the sensor of the Cine Tape Measure to create a tighter measuring area. The Cinetape Extension Tubes narrow the measurement field by about twenty percent. The ultrasonic waves are directed by the tubes towards the sensors which results in narrowing the measurement field. Notably, the tubes do not modify the characteristics of the ultrasonic waves, these remain cone-shaped. The tubes modify the cone angle by about twenty percent.

Yet another example of a prior art system is the Panatape LongRange™, a product of Panavision™. The Panatape LongRange is a low level laser finder that shows to a user the distance from the film plane to an object. The Panatape LongRange is mountable on a camera. The laser is directed to a target point in the distance, and the distance from the point to the film plane is measured by the system. The measurement is displayed to a user on a display that is incorporated in the system. The Panatape LongRange can be utilized with a smart zoom lens or other types of lenses. The Panatape LongRange solely measures distance to a discrete point on an object.

One prior art system is disclosed in U.S. Pat. No. 5,092,670, granted on Mar. 3, 1992 and invented by Howard J. Preston, that is an automatic focusing system for use with a motion picture camera. This system includes a variable focus lens attached to either motion picture camera or a video camera, and an adjusting mechanism of a lens focus barrel which adjusts the variable focus lens so that an image of a photographic subject is in focus on a focal plane. A pan/tilt head is mounted on a tripod. The automatic focusing system includes a plate, a motorized turntable, a housing and a rangefinder. The plate is mounted on the pan/tilt head. The camera is mounted on the plate. The motorized turntable is also mounted on the plate. The motorized turntable is servo controlled. The motorized turntable is disposed to a fixed and known first distance from the camera and is made to rotate along an axis parallel to the pan-axis of the pan/tilt head. The housing is mounted on the motorized turntable. The rangefinder is disposed in and mechanically coupled to the housing. The rangefinder determines a second distance to the photographic subject from the housing. This invention requires a triangulation set-up of equipment in order to measure distance.

U.S. Pat. No. 6,724,429, granted on Apr. 20, 2004 and invented by Morris Shore, Wynn Bowers, Vince H. Catlin, Felipe Navarro, and Christopher J. Verplaetse, further discloses a system for sensing and displaying lens data for a cinematography zoom lens and camera in real time. This invention captures as lens data a distance measurement by way of a rangefinder that may be mounted adjacent to the lens and usually above the lens, and that determines the actual distance from the lens to an object being photographed that is positioned in front of the lens. However, this invention does not incorporate a laser beam in the distance measurement of the system, and is operable solely to measure the distance between a lens and a point on a target object.

SUMMARY OF THE INVENTION

In one aspect, the present disclosure relates to a distance finder apparatus comprising: a rangefinder operable to project an invisible laser beam; a laser beam pointer operable to project a visible laser beam, said laser beam pointer being attachable to the rangefinder; an optical plate attachable to the ranger finder, said optical plate being operable to spread the invisible laser beam in a linear formation along a plane and to scatter the visible laser beam along the linear formation and the plane of the invisible laser beam; and one or more display means operable to display one or more distance measurements generated by the rangefinder that operable to determine the one or more distance measurements being distances between one of the one or more lenses of the rangefinder and one or more points of contact of the spread invisible laser beam with one or more objects positioned in front of the rangefinder.

In another aspect, the present disclosure relates to a distance finder system comprising: a distance finder apparatus comprising: a rangefinder operable to project an invisible laser beam and to determine one or more distance measurements between the rangefinder lens and contact of the invisible laser beam with one or more target objects; and a laser beam pointer operable to project a visible laser beam; an optical plate attachable to the distance finder apparatus and operable to spread the invisible laser beam in a linear formation along a plane and to scatter the visible laser beam along the linear formation and plane of the invisible laser beam, whereby the distance measurements are determined based on one or more points along the spread invisible laser beam where the invisible laser beam contacts the one or more target objects; and a display means operable to display the one or more distance measurements to a user; and a mount whereby the distance finder apparatus is attachable to a camera.

In yet another aspect, the present disclosure relates to an optical plate attachable to a laser rangefinder unit operable to output an invisible laser beam and having a visible laser pointer attached thereto operable to output a visible laser beam, said optical plate comprising: two cylindrical lenses so positioned on the optical plate to cause the invisible laser beam output from the laser rangefinder to be directed through at least one of the two cylindrical lenses when the optical plate is attached to the laser rangefinder, and said invisible laser beam to be spread in a linear formation along a plane; and a holographic lens so positioned on the optical plate to cause the visible laser beam output of the visible laser pointer to be directed through the holographic lens when the optical plate is attached to the laser rangefinder, and said visible laser beam to be scattered along the linear formation and the plane of the invisible laser beam; whereby the invisible laser beam and visible laser beam contact at points along the linear formation and plane one or more objects positioned in front of the optical plate attached to the laser rangefinder.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
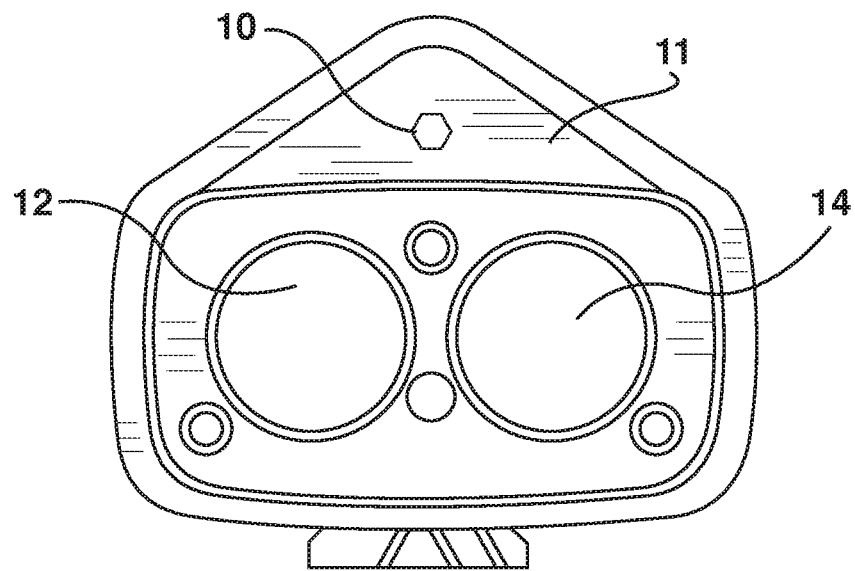
FIG. 1 is a front view of a distance finder apparatus that is an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a distance finder apparatus and system operable to project a laser beam spread in a line across a plane, and to determine the distance between a lens and objects that the spread laser beam contacts. The present invention comprises: a rangefinder incorporating an optical plate operable to cause a laser beam to be spread or otherwise scattered along a plane and so that the laser beam contacts one or more objects. The rangefinder being further operable to measure distances where parts of the scattered beam contact the one or more objects. The rangefinder also incorporates a visible pointer laser, and a display. Locations where the spread beam contacts the one or more objects may be at variant distances and measurements may be determined at any point along the scattered beam by the present invention.

The terms "distance measurement apparatus" and "distance finder apparatus" are used interchangeably herein.

In one embodiment of the present invention, a measurement may be determined by the present invention that is the distance to a point along the scattered beam where the scattered beam first makes contact with an object. The scattered beam may make contact with multiple objects and the objects may be at variant distances from the lens of the distance measurement apparatus. Measurements may be achieved by the present invention to any of the points where the scattered beam meets any of the multiple objects at variant distances from the lens of the distance measurement apparatus. Furthermore, measurements of the present invention may be determined to be the distance between either: a lens of the distance measurement apparatus and one or more of the points where the scattered beam contacts one or more objects; or a lens of the distance measurement apparatus and one or more positions in front of the lens of the distance measurement apparatus that are positions where a line drawn from one or more points where the scatted beam contacts objects would meet a hypothetical line drawn from the front of the lens at a determined angle, for example such as a 45 degree angle or a substantially 45 degree angle.

Embodiments of the present invention incorporate an optical plate that incorporates at least two lenses, for example, such as at least two cylindrical lenses. A holographic lens may also be incorporated in the present invention. In such an embodiment of the present invention, the at least two lenses may focus in one direction to spread the laser beam into a line, or substantially a linear arrangement, along a plane and the holographic lens may be utilized to scatter the beam along the line, or substantially linear arrangement. As an example, the at least two lenses may spread the invisible laser beam into a line, or substantially linear arrangement along a plane, and the holographic lens may be utilized to scatter the visible beam along the line of the invisible laser beam. In this arrangement of the present invention the invisible beam is spread into a line along a plane, but the invisible beam in the line formation is not visible to a user of the system. The visible beam is scattered along the line of the invisible line and therefore, while the visible beam is turned on the line that the invisible beam is spread along is made visible by the scattered visible beam. In this manner, the visible beam allows a user of the system to view the line where the invisible beam is spread and the one or more objects that the invisible beam is in contact with along said line.

The cylindrical lenses of the optical plate may include one lens for a transmission of a laser beam and another lens for receiving for the laser rangefinder. The receiving lens receives the laser radiation of the distance measurement apparatus. The laser radiation is in accordance with the laser radiation being reflected at an object. The receiving lens can receive the laser beam components that reflect back from the object at one or more points where the laser beam makes contact with one or more objects. In accordance with the type of object and the distance of the object from the lenses the received laser beam components may differ, for example, the signal intensity may differ, as may other aspects of the received laser beam components. Such received laser beam components received by the receiving lens can be utilized in the generation of distance measurements. As the laser beam transmitted by at least one of the lenses of the distance finder apparatus is spread over a linear plane, and is not merely a single point, the receiving lens may receive laser beam component input that relates to a variety of points along the linear plane of the spread laser beam. Therefore, the receiving lens of the present invention may be operable to receive input relating to a variety of points along the linear plane of the spread laser beam and to utilize any and all of such input in the generation of distance measurements.

The lenses transform a point laser beam to a line laser beam. The angular divergence of the line beam can be selected by using different focal length cylindrical lenses. This creates a modified field of view for the receiver. The lenses should be aligned as the lenses are not symmetrical. A misalignment of the transmission lens may create a skewed line that is not level. A misalignment of the receiver lens may cause a loss of signal intensity that can dramatically reduce the maximum distance capabilities of the laser rangefinder to determine distance measurements.

The holographic lens may be a holographic optical element operable to aim the visible laser beam. The holographic optical element is further operable to produce a visible line that consists of: a strong central dot, that represents the centre of the line; a bright central measuring line; and a less bright overage line. The holographic optical element should be aligned as misalignment may cause a skewed visible line. Moreover, the bright central measuring line is matched (to be of equal angular dispersion) to the line of the invisible laser beam projected from the cylindrical lens.

One or more lasers may be incorporated in embodiments of the present invention. For example, two lasers may be incorporated in an embodiment of the present invention. The two lasers may include an invisible laser and a visible laser. The visible laser may be coloured, for example, such as a green visible laser.

The present invention may include a display that is operable to provide information to a user regarding one or more distance measurements determined by the present invention. The display may be incorporated in the apparatus of the present invention or the display may be remote from the apparatus. A remote display unit may be linked to the apparatus either by a wired or wireless connection, whereby information may be transmitted between the display unit and the apparatus in a bi-directional manner. The remote display may further be a handheld unit.

In some embodiments of the present invention, it may be possible to utilize one remote display unit with multiple distance measurement apparatus units. The remote display unit may be required to be synched with each distance measurement apparatus unit prior to use with said distance measurement apparatus unit. The remote display unit may further be an off-the-shelf unit. Synching of a display unit for use with a distance finder apparatus may pair the display unit and distance finder apparatus for a particular period of use. In this manner a display unit and a distance finder apparatus that are in close proximity can be paired and used together for a period of time. This allows for flexibility of use of components of the system.

The present invention may be utilized with a motion picture camera or a digital video camera. The distance measurement may be set in an embodiment of the present invention so that a first pulse, last pulse, or any pulse between the first and last pulses of the scattered laser beam may be utilized to determine a distance measurement. Moreover, the invention may be set to determine distance based upon multiple pulses of the scattered beam.

The system of the present invention may be set to determine a variety of distances, for example, such as first target (to determine distance to the first object that the beam makes contact with at the point where said object first makes contact with the beam), last target (to determine distance to the last object that the beam makes contact with at the point where said object last makes contact with the beam), multiple targets (to determine distances to multiple objects and specifically points where such multiple objects make contact with the beam), strongest target (to determine distance to the object that has the strongest beam intensity, and this beam intensity is compared to a threshold, as described herein), specific point targets (to determine distance to objects located at one or more specific points along the beam), and other points along the scattered beam.

For example, in a situation where smoke is being used in an image to be captured by the camera, the scattered beam may first contact a point in the smoke prior to contacting a point on a person that is within the frame of the image to be captured by the camera. This may occur because the smoke may be a lesser distance from the distance finder apparatus than the person and therefore the beam may contact a point on the smoke prior to contacting a point on the person.

Thresholds may be set based upon the measurements of the distance between a point on the scattered laser where the laser contacts the smoke and/or a point on the scattered laser where the laser contacts the person. A user of the system may set one or more thresholds, or one or more thresholds may be set in the system prior to use of the system by a user. As an example, the return of the measurement to the point where the scattered laser contacts the smoke may be set to be below a threshold, whereas the point where the scatter laser contacts the person may be set to be above the threshold. In this example, the return off the person will be greater than the return off the smoke.

Thresholds may be set or altered by a variety of means in embodiments of the present invention. For example, a component may be incorporated in one embodiment of the present invention to be positioned over a receiver to thereby block light and cause the threshold to be lowered, so that the smoke distance measurement reading is below the threshold and the person distance measurement reading is above the threshold. As another example, the settings may be changed by a user of the present invention to thereby change the threshold. Due to the fact that users can forget to reset settings after particular uses of a camera, embodiments of the present invention may incorporate a variety of means for altering a threshold, so that a user is not always required to change settings, and may thereby reduce the effects caused when a user forgets to reset any altered settings.

The apparatus of the present invention may be attached to a camera, but the camera is not required to be aimed directly at an object that is to be utilized for distance measurements which will be utilized to focus the camera. The scattered beam of the apparatus is operable to contact objects over wide area and distance measurements may be derived for any objects that are contacted by the scattered beam. Therefore, distance measurements from any point along the beam may be utilized to focus the camera.

The spread beam may be thicker in its middle portion and the spread beam may taper on the sections of the beam that are outwardly distant from the middle portion of the scattered beam. In this manner, the scattered beam may be tapered on either end of the beam.

In one embodiment the present invention, the distance finder apparatus may be attached to a camera, and may thereby comprise a system whereby the camera is operable to focus upon at least one of one or more specified target objects in accordance with the one or more distance measurements generated by the system that are displayed to the user of the system on the display means. In this embodiment of the present invention, distance measurements may be generated on an ongoing basis in relation to the one or more target objects. For example, as the camera (and the lens incorporated in the optical plate attached to the distance finder apparatus attached to the camera) moves farther from or closer to one of the target objects, or as one of the target objects moves farther from or closer to the camera (and the lens incorporated in the optical plate attached to the distance finder apparatus attached to the camera), the system will generate updated distance measurements to indicate the new measurements of distance between one of the lenses of the distance finder apparatus and the target objects.

The distance finder apparatus may be operable to generate ongoing distance measurements over time to indicate the distances between the lens of the distance finder apparatus positioned in the optical plate and each of multiple target objects and the changes in these distance measurements due to movement of the camera and/or the target objects.

The ongoing generated distance measurements may be displayed on one or more of the display units. For example, the ongoing generated distance measurements pertaining to a specific one of the one or more target objects may be displayed on one of multiple display units, and distance measurements relating to other target objects may be displayed on one or more other display units, or all of the distance measurements for all of the target objects may be displayed on a single display unit.

The focus of the camera may be adjusted in relation to the ongoing generated distance measurements pertaining to one or more of the target objects.

The ongoing generated distance measurements, or any distance measurement generated by the system at any point in time, may be compared to any of the thresholds set in the system, or that are set by the user, as described herein. The comparison of the distance measurement to one or more of the thresholds can generate information that can be displayed for the user. The user may utilize such information indicating the relation of the distance measurement to any of the thresholds to make adjustments to the camera, such as lens adjustments, to enhance use of the camera.

Embodiments of the present invention may be comprised of off-the-shelf components and such embodiments may be cost-effective to configure. Embodiments of the present invention may be fixable in an easy, quick and cost-effective manner from readily available off-the-shelf replacement parts, should any component of the invention be broken or need to be replaced for any other reason.

The present invention offers several benefits and advantages over the prior art. The present invention is operable to determine distance measurements to objects that move within the frame of an image without being repositioned because a scattered beam is utilized to determine the distance measurements. Prior art systems can only determine distance measurements to a pinpoint location within a frame of an image, and therefore if the system is not directly aimed at the position of a target image such prior art systems are unable to determine the distance of a target object. The present invention offers a benefit over the prior art systems in that it offers a wider range of area for measuring distance without having to reposition the system than prior art systems are capable of achieving.

The present invention is operable in a manner so as to provide accurate distance measurements immediately or virtually immediately to a user. Prior art systems provide measurements on a delayed basis, or will only provide accurate readings in particular uses. Therefore, the provision of accurate and immediate measurements to a user is an advantage over prior art systems, particularly if the system is utilized for fast-paced filming and the filming of objects that are continuously moving.

Some prior art systems emit noise while functioning. Such noise can interfere with filming of a sequence if the filming integrates sound elements. This noise may need to be edited out of the film after filming occurs. Embodiments of the present invention do not emit any noise while functioning and therefore no sound becomes integrated into the filmed sequence.

Prior art systems further fail to be operable to measure the length of distance that the present invention is operable to measure. Therefore, the present invention may be utilized to measure distances to objects that are farther from the camera than prior art systems can be utilized to measure. This means that the present invention is operable in more filming situations than prior art systems.

Moreover, the present invention has a benefit over other laser distance measurement systems, in that an embodiment of the present invention that does have an optical plate incorporated therein is operable to measure significant distances that other prior art laser distance measurement systems are unable to measure. Embodiments of the present invention is operable to measure distances that are as great and far, or greater and farther, than ultrasonic devices are capable of measuring. A skilled reader will recognize that prior art ultrasonic devices are generally capable of measuring distances that are farther than distances that prior art laser distance measuring systems are capable of measuring, and will therefore recognize the benefit of the present invention.

The present invention is operable with all types of cameras, including cameras for long lens work as well as other cameras. Prior art systems are generally only operable with cameras utilized for long lens work. Moreover, due to the speed and accuracy of the present invention measurements, the present invention is operable with a wide range of camera lenses, filming environments and types and speeds of filming, including filming from a crane. The prior art is not operable to provide accurate and immediate determinations of distance in as many circumstances as the present invention.

The optical plate of the present invention does not lose accuracy due to the spreading of the beam. Prior art systems that attempt to widen the range of the laser beam loses sensitivity and accuracy, and furthermore operates more slowly. The present invention is operable to provide immediate and accurate measurements with a wide, scattered beam.

Prior art systems offer a dial that may be utilized to reduce the sensitivity of the system. This can have disadvantages when inconsistencies exist in an environment to be filmed, such as an environment that has smoke therein. The filter aspect of embodiments of the present invention offers a user the ability to manually set the level of sensitivity of the system and to apply graduated filtering that may be altered for each scene, or for different sets or jobs. This is a benefit over the prior art in that the present invention is more versatile for ease of use to film varying environments, including environments with inconsistencies.

A skilled reader will recognize that several embodiments of the present invention are possible and that such embodiments may be utilized for a variety of purposes. For example, the system of the present invention may be utilized in the entertainment industry to measure the distance between a camera and objects that may be an actor, aspects of a scene or other subject matter of an image. The distance measurement generated by the present invention may be utilized by the "focus puller" to adjust the camera lens so as to achieve a focus upon any of the objects within the frame of the image that the camera is set-up to capture at the distance of the object from the camera.

Figure 15:
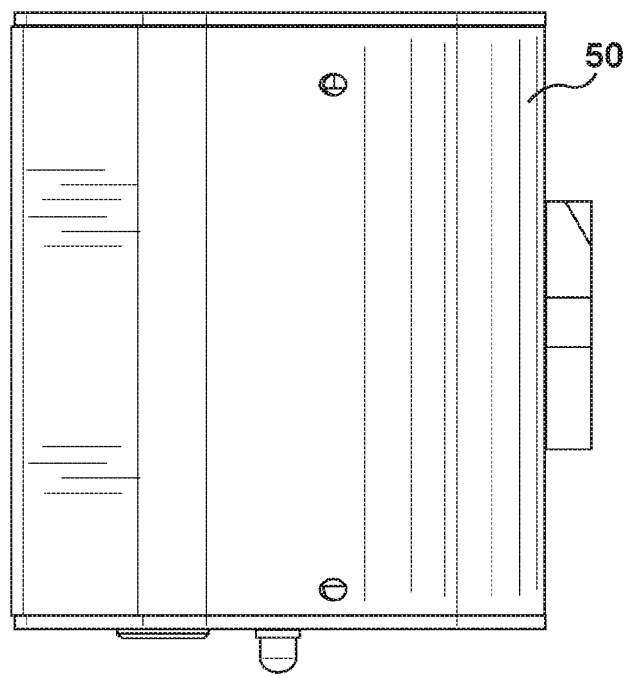
FIG. 15 is a perspective side view of a laser rangefinder unit of an embodiment of the present invention.

The distance measurement apparatus of the present invention may incorporate a combination of a laser rangefinder and a visible laser pointer. The visible laser pointer may be incorporated with the laser rangefinder in a single housing 50, as shown in FIG. 15. Or the visible laser pointer may be attached to a laser rangefinder. A skilled reader will recognize the various configurations that are possible to combine the laser rangefinder with a visible laser pointer. The combination should result in a visible laser beam being output from the visible laser pointer and an invisible laser beam being output by the laser rangefinder and both the visible and invisible laser beams should be output in the same direction from the distance measurement apparatus.

The distance measurement apparatus is operable to output laser beams and to determine the distance measurement between a lens and one or more points where the invisible laser beam contacts with one or more objects.

A skilled reader will recognize that the component operable to perform the one or more distance measurement determinations may be incorporated within the distance measurement apparatus or remote from the distance measurement apparatus, but linked, either by wire or wirelessly, to the distance measurement apparatus and the display means of the system.

The distance measurement apparatus is further operable to transmit information regarding all distance measurement determinations to a display unit, either through a wired or wireless means. The display unit may be incorporated in the distance measurement apparatus, or remotely from the distance measurement apparatus.

The distance measurement apparatus may also receive information transmitted from the display unit, including controls for the distance measurement determinations.

Embodiments of the present invention may incorporate a single display unit, or multiple display units, if multiple display units are incorporated in the system, these units may be configured to display the same information, or may be configured to display different information. For example, one display unit may be configured to display the distance to the point where the beam first contacts an object (the closest contact), whereas another display unit may be configured to display the distance to the point where the beam last contacts an object (the farthest contact), other display units may be also be configured to display other distance measurements.

Moreover, the display units may be operable to show the same information generally, so that a plurality of distance measurements may be scrolled through or otherwise displayed in some sequence on the display unit, but one or more of the multiple display units in a system may be configured to display a particular type of measurement initially, and the user would need to scroll or otherwise cause the display unit to display the other measurements.

Additionally, one or more display units may be connected to the distance finder apparatus by a wireless connection and one or more other display units may be connected to the distance measurement apparatus by a wired connection. Alternatively all of the display Units may be connected to the distance measurement apparatus by the same type of connection, namely wired or wireless. A skilled reader will recognize the variety that may be incorporated in embodiments of the present invention of any of the following: the number of display units; the function of said display units; and the types of connection of said display units to the distance measurement apparatus.

A benefit of incorporating multiple display units in embodiments of the invention, and having some of those units connected by a wired connection, and other units connected by a wireless connection, may be that a remote interface may be achieved. In the film industry cranes and steadicam innovations may be utilized, and these compound the movement of the camera. If multiple display units are incorporated in m embodiment of the present invention a user may move freely from one side of the camera to the other and have a display unit available on either side of the equipment, for example, such as a camera, a dolly, a steadicam, a crane, or any other equipment. This allows a camera operator to utilize the space of the assistance body when the camera is in close proximity to a wall or other barrier, thereby creating a wider range of motion for camera movement. The operator may be able to save takes, otherwise known as achieving "save overs", should an actor miss his mark and end up stacking up on another actor. The ability to save takes may save time, and therefore reduce costs, if the present invention is utilized on a film set.

The distance measurement apparatus may be powered by a variety power sources, such as a batteries, solar power, a connection to an electrical outlet, or any other power source. The distance measurement apparatus may further provide power to other units of the system, such as a display unit if there is a wired connection between the apparatus and the display unit. The distance measurement apparatus may incorporate an indicator, for example such as a LED indicator, that is lighted when either the targeting laser (being the visible laser aiming device), or the distance laser (being the laser rangefinder) are powered on.

A skilled reader will further recognize that it is possible that the laser rangefinder and visible laser pointer elements of the present invention may be off-the-shelf components in some embodiments of the present invention.

Figure 11:
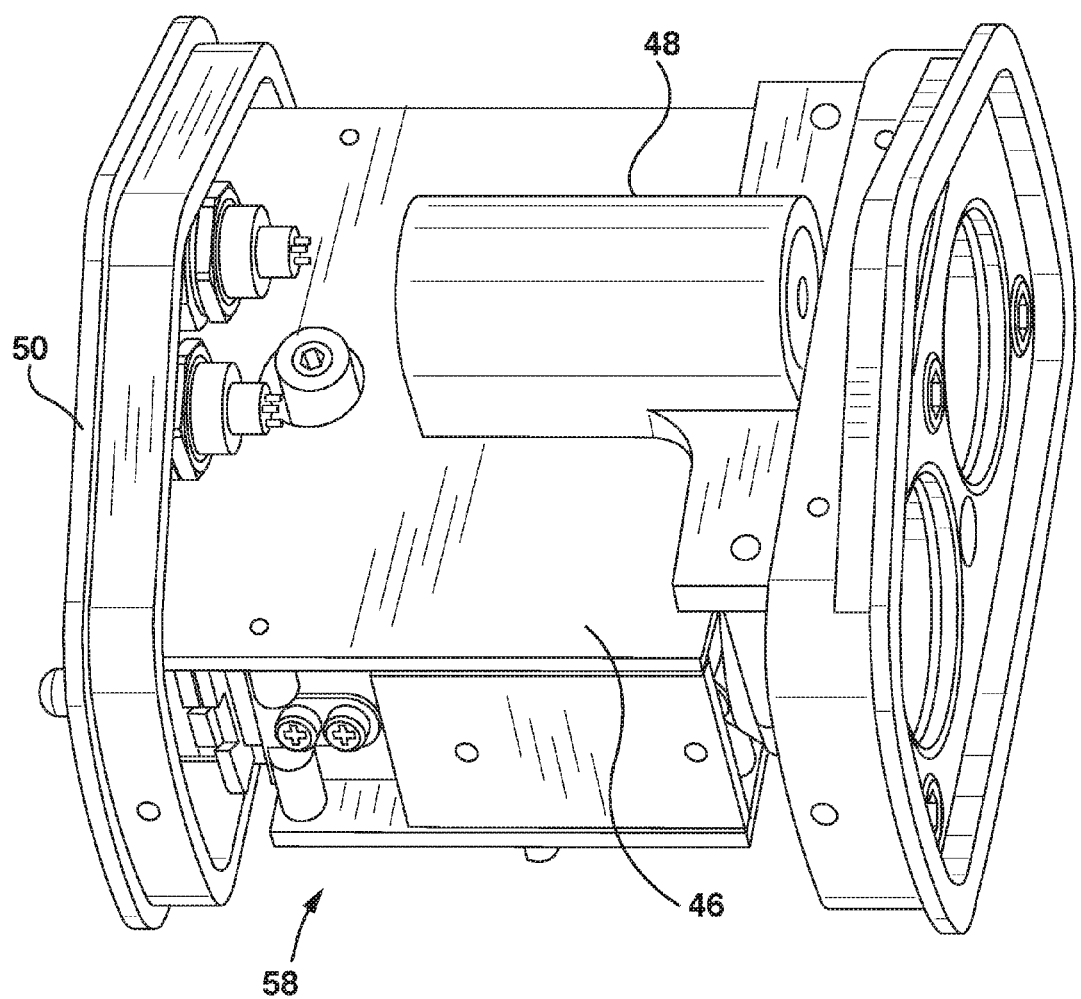
FIG. 11 is a perspective top view of the interior of a laser rangefinder unit of an embodiment of the present invention.
Figure 16:
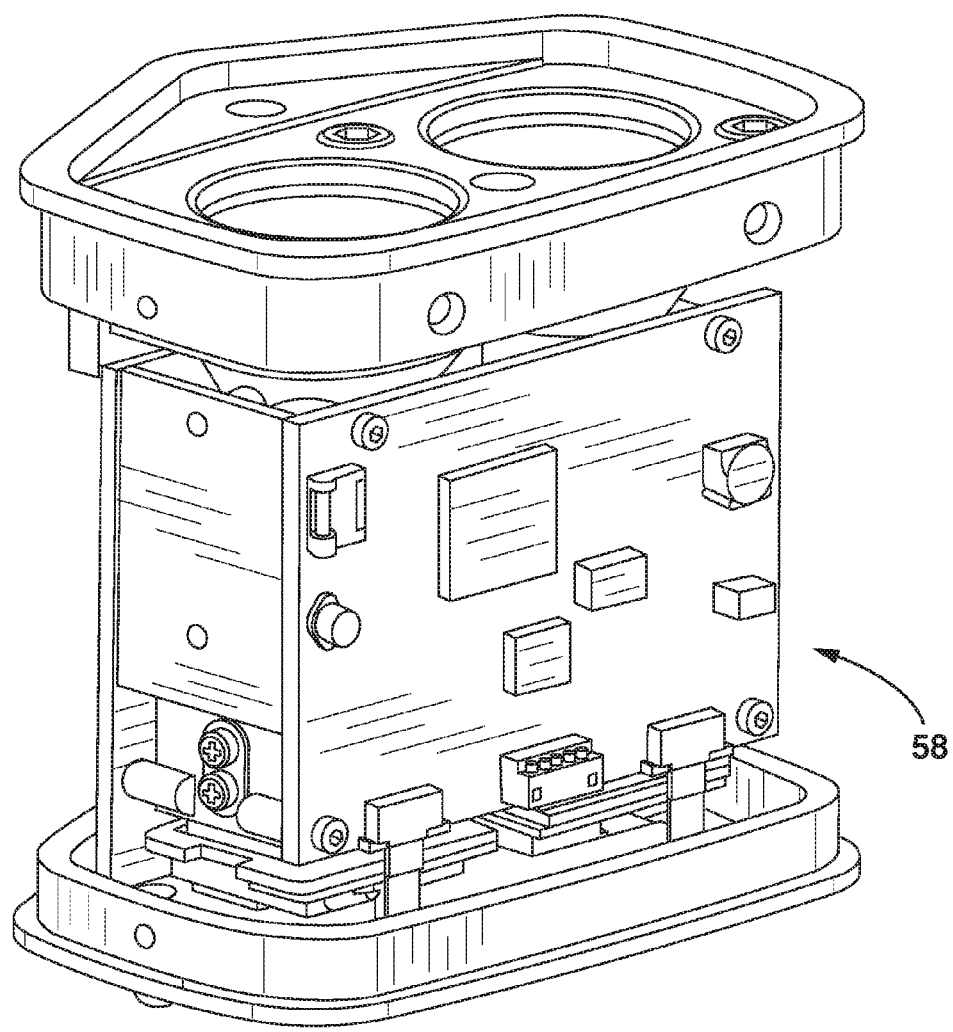
FIG. 16 is a perspective bottom view of the interior of a laser rangefinder unit of an embodiment of the present invention.

In one embodiment of the present invention, the laser rangefinder 46 and visible laser pointer 48 are configured to be contained within a single housing 50, as shown in FIG. 11. This housing may further incorporate the processing means 58 operable to determine the distance measurements, as shown in FIGS. 11 and 16.

Figure 14:
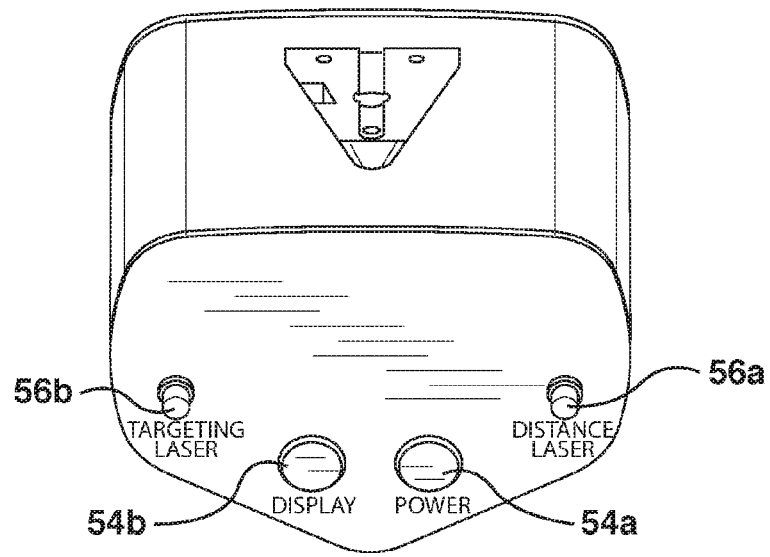
FIG. 14 is a perspective view of the back face of a laser rangefinder unit of an embodiment of the present invention.

The housing may further incorporate laser unit control means, for example, as may be provided as buttons, dials, ports 54*a* and 54*b*, or as LED indicators 56*a* and 56*b*, as shown in FIG. 14. The laser unit control means may control functions of the distance finder apparatus, such as powering the apparatus on or off, controlling the transfer of information to the display unit, targeting the laser beams, and controlling the distance of the laser beams. A skilled reader will recognize that a variety of types of control means for the purpose of controlling a variety of the functions of the system may be incorporated in the distance finder apparatus.

One embodiment of the distance measurement apparatus of the present invention may have a front face 11, as shown in FIG. 1. The front face may incorporate a visible laser pointer output means 10, for example, such as green visible laser pointer output means, whereby output of a visible laser pointer may be directed to the environment in front of the optical plate.

The front face may include two lenses. At least one lens is a transmitter lens 12 that is operable as a transmit lens for the laser rangefinder that is incorporated in the distance measurement apparatus. At least one lens is a receiver lens 14 that is operable as a receive lens for the laser rangefinder that is incorporated in the distance measurement apparatus. The receiving lens is operable to receive laser radiation of the distance measurement apparatus, being the laser radiation being reflected at an object. This received information may be utilized by the distance measurement apparatus to determine distance measurements.

Figure 12:
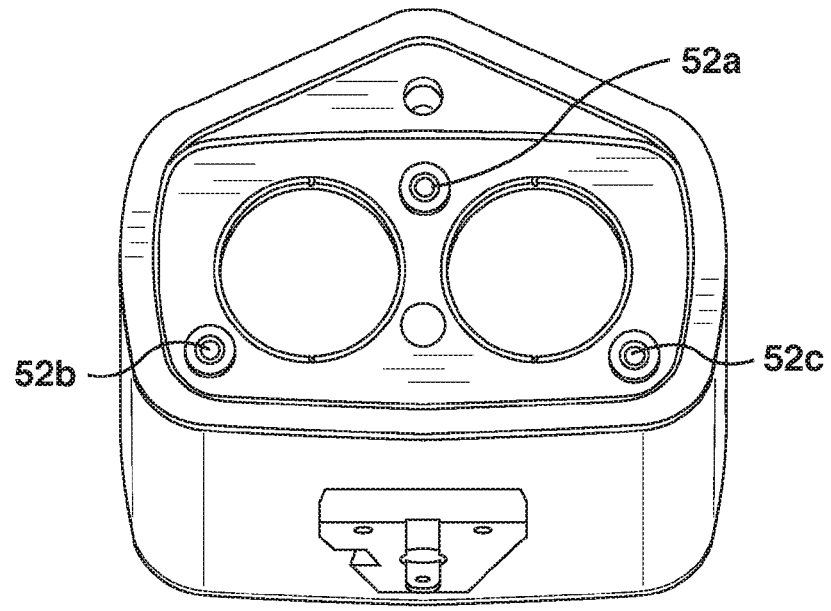
FIG. 12 is a perspective view of the front face of a laser rangefinder unit with a visible laser beam output incorporated therein of an embodiment of the present invention.

The front face may further incorporate one or more attachment means, for example, such as one or more screw receivers 52*a*, 52*b*, 52*c*, as shown in FIG. 12. Such attachment means may be utilized to attach an optical plate to the front face of the distance tinder apparatus. A skilled reader will recognize that a variety of attachment means may be incorporated in the present invention for this purpose and that the optical plate may be fixedly or removeably attached to the front face of the distance finder apparatus.

Figure 13:
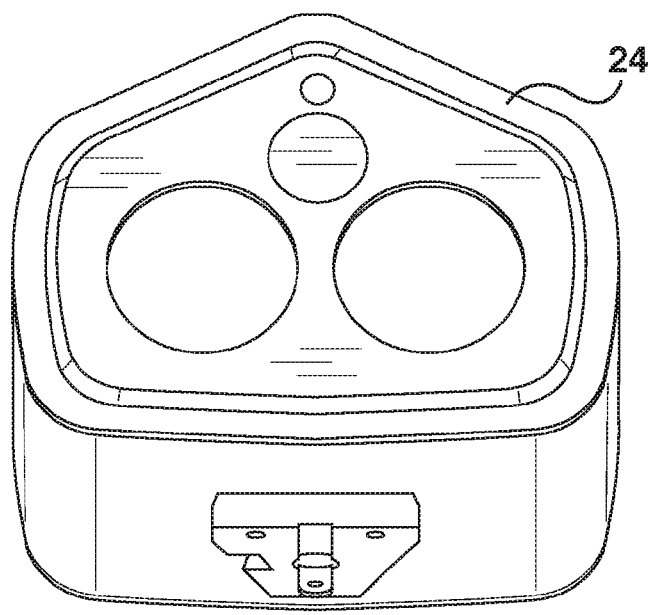
FIG. 13 is a perspective view of the front face of a laser rangefinder unit with a visible laser beam output incorporated therein with an optical plate attached thereto of an embodiment of the present invention.

The optical plate 24 may be attachable to the front face of the distance finder apparatus so that the optical plate is positioned in front of the front face of the distance finder apparatus, as shown in FIG. 13. The optical plate may incorporate holes wherein two cylindrical lenses and a holographic beam shaper element may be inserted and held therein. In combination the lenses and holographic beam simper element may direct a beam so that the beam is a diffracted and makes contact with one or more target objects as a line of beam scattered along a plane, for example, such as a horizontal plane.

Figure 3:
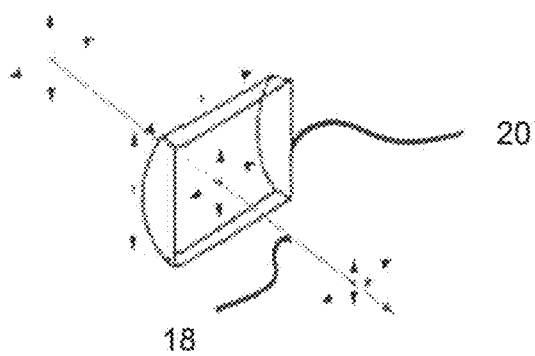
FIG. 3 is a diagram of the focus of a cylindrical lens that is a component of an embodiment of the present invention.

At least one cylindrical lens is operable to focus the laser beam projected by the laser rangefinder incorporated in the distance measurement apparatus. The lens may be operable to focus the laser beam in only one direction, so as to result in a laser line profile. An example of the result of a laser beam 18 being focused in such a manner by a cylindrical lens 20 is shown in FIG. 3. The cylindrical lens 20 shown in FIG. 3 is a rectangular shaped. In other embodiments of the present invention the lens may be round shaped, or other shapes.

Figure 4:
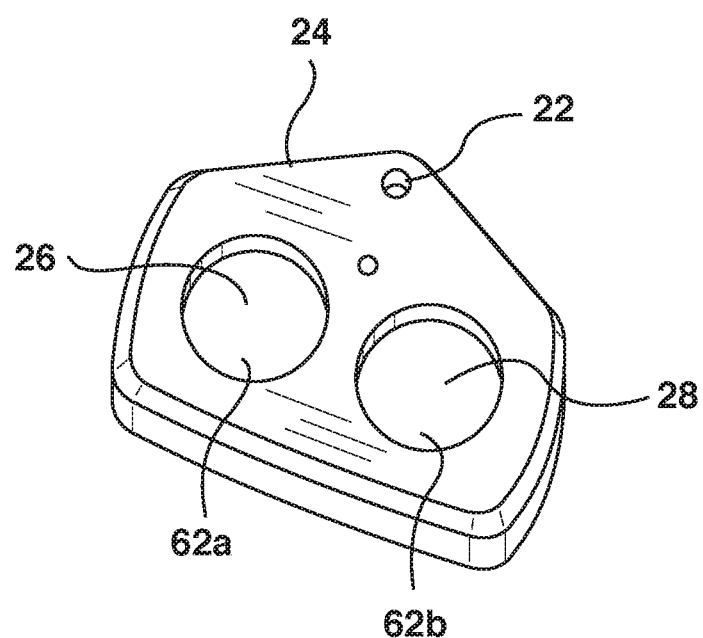
FIG. 4 is a perspective view of the optical plate that is a component of an embodiment of the present invention.

The holographic beam shaping element incorporated in the optical plate is operable to create a laser line from the visible laser pointer output. The holographic beam shaper 22 may be positioned in the optical plate 24 so that the visible laser pointer output passes through the holographic beam shaper, as shown in FIG. 4. Holes 26, 28 may be incorporated in the optical plate and the cylindrical lenses may be positioned in a fixed or removable manner within said holes when the optical plate is assembled.

Figure 17:
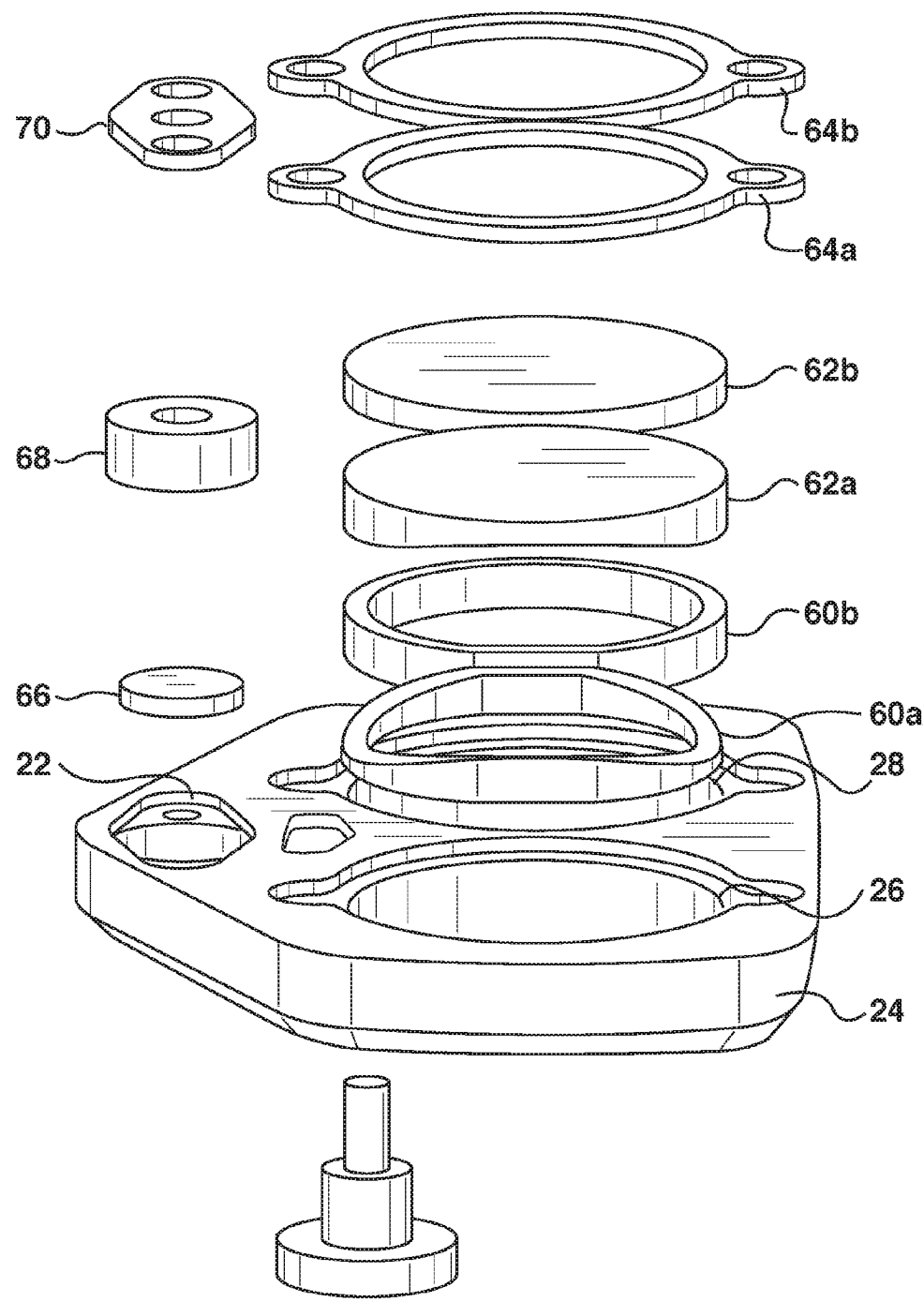
FIG. 17 is an exploded view of an optical plate of an embodiment of the present invention.

As shown in FIG. 17, the optical plate 24 may incorporate two cylindrical lens holes 26 and 28 for holding cylindrical lenses 62*a*, 62*b*. In embodiments of the present invention, the holes may further hold lens holders 60*a*, 60*b*, and lens covers 64*a*, 64*b*. The optical plate may further incorporate a hole 22 for holding a holographic lens 66, a holographic lens holder 68 and a holographic lens cover 70. The cylindrical lenses and the holographic lens, as well as the pieces that also fit into the holes to support the lenses may be fixedly attached to the optical plate, or may fee removable from the optical plate, In embodiments of the present invention that incorporate removable lenses, the lenses may be removed and replaced by other lenses, as required.

In embodiments of the present invention, the distance finder apparatus may be an off-the-shelf laser rangefinder, or any other laser rangefinder that has a visible laser pointer incorporated therein, or otherwise attached thereto. When the laser rangefinder is utilized without the optical plate being attached thereto, the laser beam output that is projected from the laser rangefinder and the visible laser pointer are narrow circular beams. As an example, the laser beam produced by and projected from the laser rangefinder may be a circular beam of approximately 0.17 degrees. The laser beam from the rangefinder may further be an IR beam. The laser beam produced by and projected from the visible laser pointer in this example may be a circular beam of approximately 0.06 degrees.

During camera set-up the visible beam may be utilized in embodiments of the present invention to visually aim the beam from the laser rangefinder to the target object, or objects. For example, such as a target object, or objects, that includes an actor, an aspect of the scene, and/or any other subject. In this manner the visible beam assists with the set-up of the camera that is to be focused upon a particular target object (or objects) that will be in the shot prior to the start of the camera capturing the image. For example, such as prior to the start of filming any motion picture images or digital video images. The visible beam is not utilized during filming because the said visible beam is visible and therefore would be captured in the images by the camera.

Notably, narrowly focused beams are utilized in the prior art for the purpose of long range shots that involve the use of telephoto and/or long focal length lenses. In such longer shots the camera field of view is usually entirely or near to entirely filled with one object, for example, such as a face or any other object. As an example, in some longer shots approximately 90% of the frame of the image that represents the camera field of view is filled with a single target object. In such a shot aiming a camera can be a straightforward activity.

The present invention is operable in long range shots as well as other types of camera work. The present invention incorporates spread beams that are wider in range than the narrow focused beam of the prior art. This offers advantages to the present invention over the prior art, as discussed herein. In particular, the incorporation of the optical plate into the distance finder apparatus of the present invention can assist with dynamic filming. In such filming the target object may move during a filmed sequence, and/or may not fill a significant portion of the frame of a filmed image. In such an instance a narrow laser beam may not make contact with the target object during filming, or at least not during the filming of an entire filmed sequence. This is particularly the situation during filmed scenes that capture fast movement.

Moreover, scenes filmed using a prior art anamorphic lens may be prone to the problem of a narrow beam missing contact with the target object during filming. An anamorphic lens contains cylindrical optical elements that compresses or "squeezes" an image horizontally. This compression of an image allows a wide screen image to be photographed onto a standard film frame, for example, such as a 35 mm film frame. During project, a lens is utilized to un-compress, or "un-squeeze" the image, and the result is that a wide-screen image is produced. The anamorphic field is approximately proportional as follows 2.4:1, or this can be expressed as an approximate proportional field that is of 2.4 width by 1 height. The wide field of view of a wide angle image can encompass many objects within a scene. One or more of these objects may need to be tracked by a camera during a filmed segment.

The present invention overcomes the disadvantages of the prior art in that when the optical plate is attached to the front of the distance finder apparatus of the present invention, and thereby incorporated in the distance finder apparatus, it is operable to modify the output from the laser beams so that the beams are not projected as narrow circular points, but instead are projected as a line image. The beams are scattered over an area and the spread is linear, or substantially linear, along a plane, such as a horizontal plane or substantially horizontal plane.

As an example, in one embodiment of the present invention, if an optical plate that is approximately 17 degrees is utilized the output beam will be approximately 17 degrees by 0.17 degrees for the laser projected by the laser rangefinder, and the output beam of the visible laser will be approximately 17 degrees by 0.06 degrees. A skilled reader will that the optical plate may be of various degrees, and that the optical plate that is approximately 17 degrees that is one embodiment of the present invention is merely one example of an optical plate of an embodiment of the present invention, other sizes of optical plates are also possible.

When projected through the optical plate, the position of the scattered, wide visible beam may match the position of the scattered invisible beam. The camera operator would therefore be able to visually see the position of the visible beam and would therefore also be aware of where the invisible beam is aimed prior to the start of filming. The visible beam may be blocked, shut off, or otherwise no longer projected outside beyond the walls of the distance measurement apparatus after filming begins. This would cause the visible beam to not be visible in the filmed images. However, based on the position of the visible beam projected prior to the start of filming, the camera operator and any other persons who saw the visible beam prior to the start of filming, would be aware of the position where the invisible beam is aimed. The invisible beam will continue to be aimed in this position during shooting. All distance measurements determined during shooting will be based on the position of the invisible beam.

The scattered beam provides the camera operator, or other user of the system, with an amount of latitude in regards to aiming the beam so as to contact with one or more target objects during filming. Should any of the target objects move during filming the beam may continue to contact with said object as the beam is scattered over a wide area, so that as the object moves different points along the scattered beam may contact the object during filming. Therefore, if one or more target objects are tracked during filming, the camera is not required to be aimed exactly at any of the objects in order for the scattered beam to contact the objects. The distance to any of the objects may therefore be measured from any point of the scattered beam that contacts each object. And as an object moves during filming the distance to the object may be measured from various points along the scattered beam as the object comes into contact with different points along the beam, at varying distances from the camera, as the object moves father and nearer to the camera and to different positions along the beam.

The measured distance may be used by a user of the system, such as a focus puller, for specific purposes, for example, such as to focus the camera, so that any target object remains in focus during filming, even as said target object is moving during filming.

In embodiments of the present invention, the angle of the scattered beam may be altered by incorporating different cylindrical lenses within the optical plate.

In embodiments of the present invention, the same cylindrical lens may be used in front of the receiver lens of the laser rangefinder to increase the field of view.

In embodiments of the present invention, the accuracy of the system may not be affected if the width or angle of the scattered beam is altered. However, at some angles, the maximum range of the scattered beam may be degraded.

Figure 9:
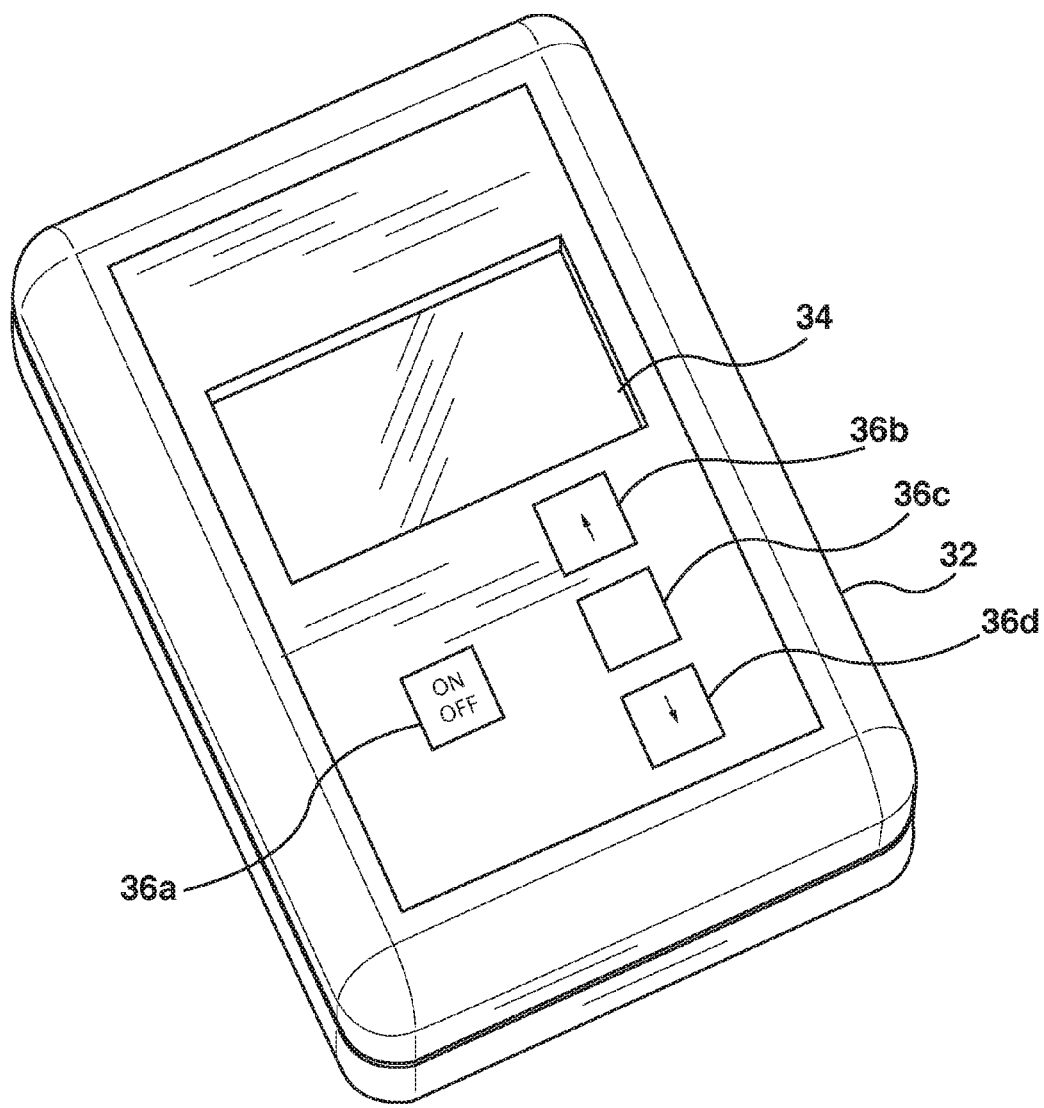
FIG. 9 is a perspective view of the front of a handheld display unit of an embodiment of the present invention.

A display operable to communicate the distance measurement information generated by the present invention to a user may be incorporated in the distance finder apparatus, or may be provided as a remote unit. As shown in FIG. 9, the display unit may be a handheld unit 32 that incorporates a display screen 34 and control means. The display screen may be an organic light emitting diode display in some embodiments of the present invention. The control means may be buttons 36a, 36b, 36c, 36d, or any other control means whereby input may be communicated to the display unit by a user, including a dial feature, voice commands means, or any other control means. The control means may be utilized to do any of one or more of the following: operate the powering on and off of the display unit; setting one or more thresholds; setting the type of distance measurement to be determined by the system; scrolling though information communicated to a user on the display screen; or other commands and/or operations. The control means may include a pointer control (for turning the visible aiming device, which is the visible laser beam, on and off), an offset control whereby units for the output information (such as measurement units, such as feet, inches, meters, etc.) may be set, a display brightness setting, an exit button, an enter button, a power on/off button, up and down arrow buttons, and/or any other controls or buttons. The use of the control means may be facilitated by the display screen that may display information relating to the use of the control means, such as controls selected, or control choices available to a user.

Figure 6:
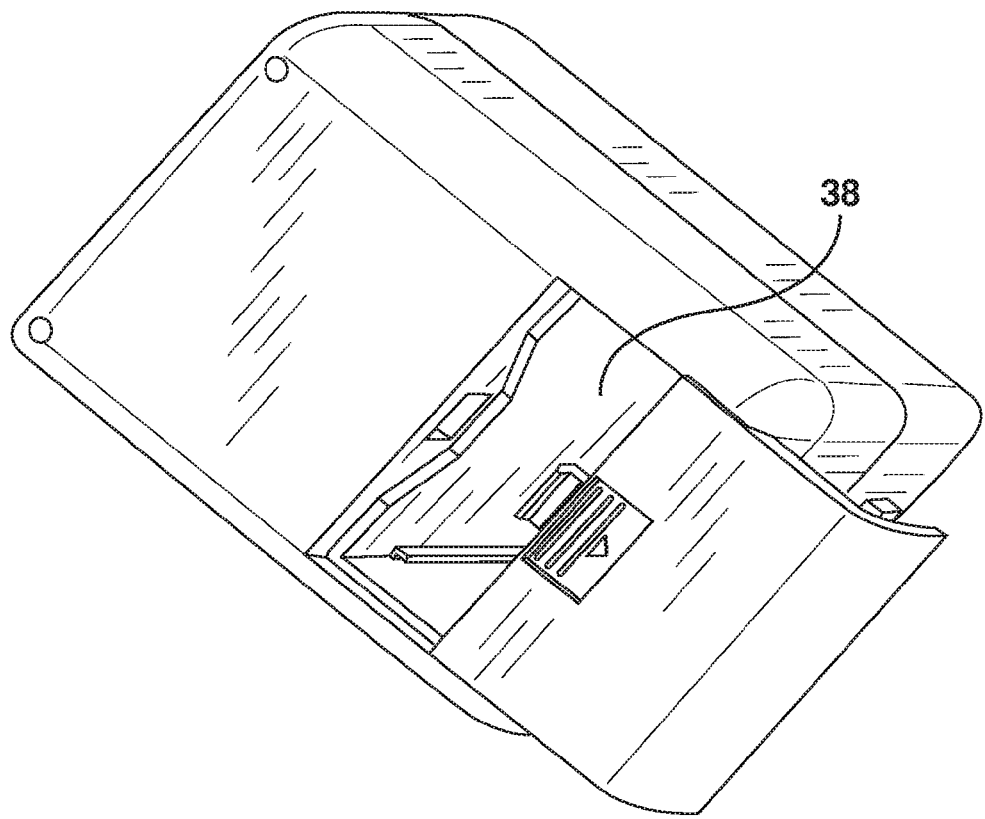
FIG. 6 is a bottom perspective view of an open battery holder of a handheld display unit of an embodiment of the present invention.

The display unit is powered by a power source, that may be a battery, solar power, or any other power source. For example, the display unit may be linked directly through a wired means to the distance finder apparatus and may draw power from the distance finder apparatus through the wired connection, and/or the display unit may be connected to an electrical outlet and may draw power for this connection. One embodiment of the invention may include a power source that incorporates an openable battery holder 38 where batteries are inserted to power the display unit, as shown in FIG. 6. A skilled reader will recognize that a variety of power sources may be utilized to power the display unit.

Figure 7:
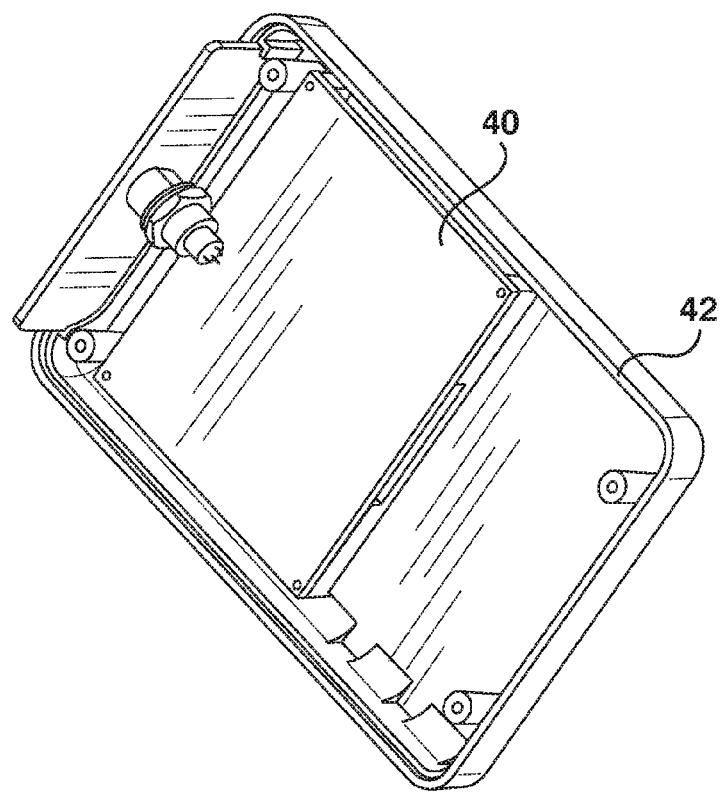
FIG. 7 is a perspective view of the interior of a handheld display unit of an embodiment of the present invention incorporating a processing unit.

The display unit may incorporate a processing unit 40 within a housing 42, as shown in FIG. 7. The processing unit may be a computer processing unit operable to receive information from the distance finder apparatus and to process such information so that information is provided to the user by way of the display screen. For example, in this manner one or more distance measurements may be communicated to a user. The processing unit may further receive information inputted by a user, such as by way of the command means, and the processing unit may process such information and transfer information to the distance finder apparatus. For example, a user may input a command that is a setting for the type of distance measurement to be determined, such as a command to determine the distance measurement from the first contact of the laser beam with an object. This command is input by the user into the display unit and the display unit transfers this command as information to the distance finder apparatus.

Figure 8:
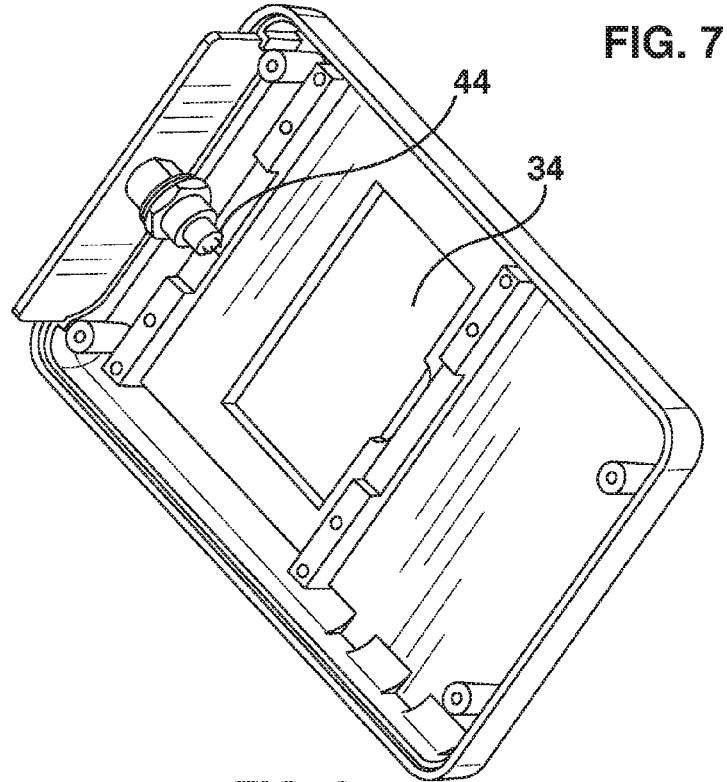
FIG. 8 is a perspective view of the interior of a handheld display unit of an embodiment of the present invention.
Figure 10:
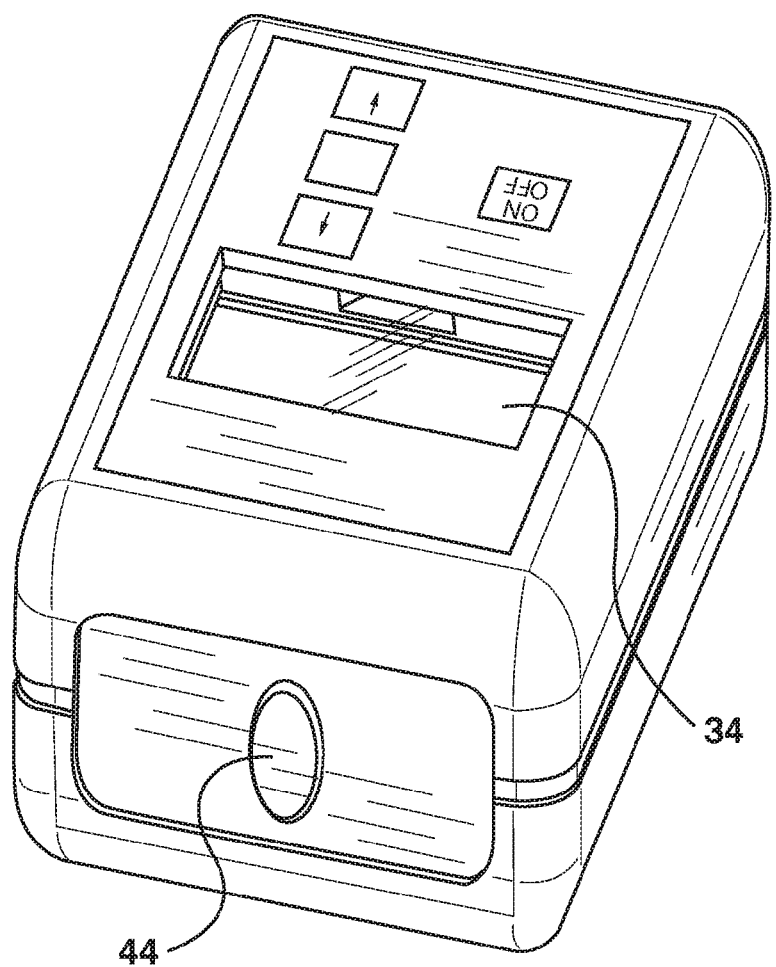
FIG. 10 is a perspective view of the top of a handheld display unit of an embodiment of the present invention.

The display unit may further incorporate a receptor means, or port 44 whereby a wired contact may be connected to the display unit, as shown in FIGS. 8 and 10. The display unit may be wireless in embodiments of the present invention.

The display unit may also incorporate a screen 34. Information may be communicated to a user when it is displayed on the screen, as described herein.

One embodiment of the present invention may incorporate a filter. Said filter may be incorporated in the optical plate. The filter may cover, block or otherwise alter the projection through one or more of the lenses of the optical plate. The filter may be of several types, for example, such as of a fan style. The filter may be positioned to block the receiver lens of the laser rangefinder.

Figure 5:
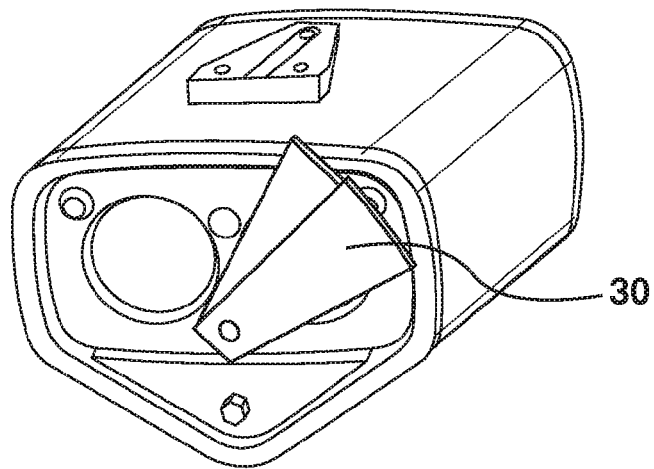
FIG. 5 is a front perspective view of a distance finder apparatus incorporating a smoke filter that is an embodiment of the present invention.

For example, a filter 30 may be incorporated in an embodiment of the present invention that blocks one lens of the present invention, as shown in FIG. 5. Such a filter may cover the receiver lens. This reduces the amount of light entering the receiver lens. When a reduced amount of light enters the receiver lens the signal intensity is reduced. A skilled reader will recognize that the filter position may be chosen to either fully cover or partially cover the lens in accordance with the reduction in signal intensity that is required to be achieved. Extraneous light influences can have a negative effect on the signal-to-noise ratio and the filter is operable to optimize the signal-to-noise ratio.

The filter may be rotatable so as to be moved from a position whereby the lens is not covered, to a position that blocks the lens or any position that partially blocks the lens. One or more filters may be attached to the laser rangefinder, or to the optical plate. A filter may be attached by way of any attachment means, including a screw attachment, to the face plate of the optical plate, or a screw attachment to the lens, or any other attachment means.

One or more filters may be incorporated in the present invention and utilized by a user in a variety of means and for a variety of purposes. One example of the use of a filter is that should a director wish to alter the look of a video filming from digital (for example, such as high definition digital film) to analog film, smoke may be added to the environment that is to be filmed. Smoke is a reflector of laser light and prior art laser rangefinders work to measure to the smoke and will not measure to any object that is within the smoke. A filter of an embodiment of the present invention may be utilized in a filming environment containing smoke to reduce the overall signal intensity, of the smoke and the object, to the point whereby: the smoke signal intensity registers below a particular threshold of the laser rangefinder; and the object signal intensity remains above the threshold. The system of the present invention can be configured to measure distance utilizing the signal that is above the threshold and therefore can detect that the object signal is above the threshold and may determine the distance measurement utilizing the object signal. In this embodiment of the present invention the filter may be chosen in accordance with the smoke density in order to dynamically achieve the required reduction in signal intensity.

As a skilled reader will recognize, when laser light contacts smoke it scatters off the smoke. Therefore, in an embodiment of the present invention a smoke filter may be used to block the aperture of the receiver and this may reduce the return signal from the smoke. The smoke filter may be adjusted until the return signal from the smoke is below a detection threshold. Notably, the target object return signal is likely a much stronger signal than any return signal generated by a beam scattering off the smoke, because the laser light scatters more when it contacts the target object than when it contacts the smoke. Therefore, when the overall signal levels are reduced by the use of the smoke filter, the target signal may remain above the threshold for detection. The smoke filter may be utilized with the present invention to eliminate the smoke return signal.

A skilled reader will recognize that this is but one example of the use of a filter, and that filters may be incorporated in embodiments of the present invention to alter the signal intensity for other purposes and by way of other means.

In embodiments of the present invention, a tinted plate may fit over the laser rangefinder and be attached to the laser rangefinder in a manner similar to the optical plate. The tinted plate may be shaped and sized in tire same manner as an optical plate. A tinted plate filter may be attached to the tinted plate in a similar manner, and having a similar position, as any of the one or more filters are attached to the optical plate, as described herein. The tinted plate filter attached to tinted plate may function in a similar manner as is described herein for the filter attached to the optical plate.

The tinted plate may be tinted a colour, for example, such as a green colour. The tinted plate may be semi-translucent and the tint may be sufficiently dark so that the lenses of the laser rangefinder may not be readily or easily visible to the naked eye when the tinted plate is fitted over the laser rangefinder. The tinted plate may be tinted to a colour that is the same, or virtually the same, as the colour of the visible laser, so that when the tinted plate is fitted over the laser rangefinder that incorporates a visible laser of the same, or virtually the same, colour the attenuation of the visible laser is minimal.

The tinted plate may protect the lenses of the laser rangefinder when it fitted over the laser rangefinder.

Figure 2:
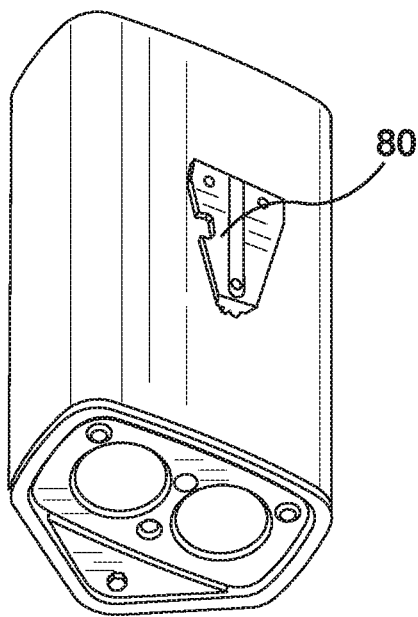
FIG. 2 is a bottom perspective view of a distance finder apparatus that is an embodiment of the present invention.

The distance measurement apparatus of the present invention may be attached to a camera in one embodiment of the present invention. A skilled reader will recognize that the attachment to a camera may be a fixed or removable attachment and that a variety of attachment means may be utilized for this purpose. One example of an attachment means incorporated in an embodiment of the present invention is the mounting piece 80 shown attached to the bottom wall of the distance measurement apparatus, as shown in FIG. 2.

Embodiments of the present invention may be set to increase the data rate whereby the distance measurements are determined, for example, such as from approximately 20 readings/second to 200 readings/second. This can be useful in particular for filming of fast real-time motion.

Embodiments of the present invention may further determine the measurement of the speed of an object, and this information may be communicated to a user of the system, such as via the display means.

Still other embodiments of the present invention may incorporate high and low gate settings. A high gate setting will cause the system to not display a distance output beyond a certain distance, whereas a low gate setting will cause the system to not display a distance output below a certain distance. The high and low gate settings can be set simultaneously to define a range of distance that will be displayed, being the range distance between a low gate and a high gate settings. This can be utilized when filming a large area, but the scene to be filmed will never move beyond specified distances.

It will be appreciated by those skilled in the art that other variations of the embodiments described herein may also be practiced without departing from the scope of the invention.

We claim:

1. A distance finder apparatus comprising:
   (a) a rangefinder operable to project an invisible laser beam;
   (b) a laser beam pointer operable to project a visible laser beam, said laser beam pointer being attachable to the rangefinder;
   (c) an optical plate attachable to the ranger finder and positioned so that the invisible laser beam is aimed towards one or more objects and is transmitted from the rangefinder through the optical plate and the visible laser beam is transmitted from the laser beam pointer in the same direction as the invisible laser beam, said optical plate being operable to spread the invisible laser beam in a linear formation along a plane and to scatter the visible laser beam along the same linear formation and the same plane as the invisible laser beam; and
   (d) one or more display means operable to display one or more distance measurements generated by the rangefinder that operable to determine the one or more distance measurements being distances between one of the one or more lenses of the rangefinder and one or more points of contact of the spread invisible laser beam with the one or more objects.

2. The distance finder apparatus of claim 1, wherein the one or more display means are connected to the rangefinder by one or more of the following: a wired connection; or a wireless connection.

3. The distance finder apparatus of claim 1, wherein the optical plate incorporates at least two lenses and a holographic lens, and the optical plate is positioned over the front face of the rangefinder so that the invisible laser beam is projected through one or more of the at least two lenses, and the visible laser beam is projected through the holographic lens.

4. The distance finder apparatus of claim 3, wherein the least two lenses are two cylindrical lenses.

5. The distance finder apparatus of claim 1, wherein a filter is attached to the optical plate and said filter is operable to wholly or partially cover one or more of the at least two lenses to decrease signal intensity of the invisible laser beam.

6. The distance finder apparatus of claim 1, wherein the display means is a hand held device remote from the rangefinder.

7. The distance finder apparatus of claim 1, wherein the distance finder apparatus is powerable by one or more of the following: an electric power source; a solar power source; or one or more batteries.

8. The distance finder apparatus of claim 1, wherein the projection of the visible laser beam is operable to be turned-off during operation of the distance finder apparatus.

9. A distance finder system comprising:
   (a) a distance finder apparatus comprising: a rangefinder operable to project an invisible laser beam towards one or more target objects and to determine one or more distance measurements between the rangefinder lens and contact of the invisible laser beam with the one or more target objects; and a laser beam pointer operable to project a visible laser beam in the same direction as the invisible laser beam;
   (b) an optical plate attachable to the distance finder apparatus and positioned so that the invisible laser beam is transmitted from the rangefinder through the optical plate and the visible laser beam is transmitted from the laser beam pointer, operable to spread the invisible laser beam in a linear formation along a plane and to scatter the visible laser beam along the same linear formation and the same plane as the invisible laser beam, whereby the distance measurements are determined based on one or more points along the spread invisible laser beam where the invisible laser beam contacts the one or more target objects; and
   (c) a display means operable to display the one or more distance measurements to a user; and
   (d) a mount whereby the distance finder apparatus is attachable to a camera.

10. The distance finder system of claim 9, wherein the distance measurements are generated on an ongoing basis in relation to a distance between the optical plate and at least one of the one or more target objects.

11. The distance finder system of claim 10, wherein the use focuses a camera mounted to the distance finder system over time in accordance with the ongoing generated distance measurements.

12. The distance finder system of claim 9, wherein at east one of the one or more distance measurements are utilized to set one or more thresholds.

13. The distance finder system of claim 12, wherein the distance measurements are compared to the one or more thresholds and one or more comparison results are provided to the user as output on the display means.

14. The distance finder system of claim 9, wherein the one or more distance measurements are generated in accordance with one or more measurement parameters.

15. The distance finder system of claim 14, wherein the one or more parameters include one or more of the following; a distance between the optical plate and a first point where the invisible beam contacts one of the one or more target objects; distances between the optical plate and at least two of the one or more target objects; a distance between the optical plate and a last point where the invisible beam contacts one of the one or more target objects; a distance between the optical plate and one of the one or more target objects having a beam intensity that is strongest in comparison to a threshold; and a distance between the optical plate and one or more specific points along the invisible beam.

16. An optical plate attachable to a laser rangefinder unit operable to output an invisible laser beam towards one or more objects and having a visible laser pointer attached thereto operable to output a visible laser beam in the same direction as the invisible laser beam, said optical plate comprising:
  (a) two cylindrical lenses so positioned on the optical plate to cause the invisible laser beam output from the laser rangefinder to be directed through at least one of the two cylindrical lenses when the optical plate is attached to the laser rangefinder, and said invisible laser beam being spread in a linear formation along a plane after it passes through the at least one of the two cylindrical lenses; and
  (b) a holographic lens so positioned on the optical plate to cause the visible laser beam output of the visible laser pointer to be directed through the holographic lens when the optical plate is attached to the laser rangefinder, and said visible laser beam being scattered after it passes through the holographic lens along the same linear formation and the same plane as the invisible laser beam;
  whereby the invisible laser beam and visible laser beam contact at points along the linear formation and plane the one or more objects.

17. The optical plate of claim 16, wherein the invisible laser beam is spread in the linear formation along the plane due to the at least one of the two cylindrical lenses transforming a point of the invisible laser beam to a line in accordance with angular divergence relating to a local length of said at least one of the two cylindrical lenses.

18. The optical plate of claim 16, wherein the scattered visible laser beam is aligned with the spread invisible laser beam.

19. The optical plate of claim 16, wherein one or more filters are attachable to at least one of the one or more lenses to augment or reduce signal levels.

20. The optical plate of claim 16, wherein one of the two cylindrical lenses directs the laser beam output from the laser rangefinder and the other of the two cylindrical lenses is operable as a receiver for the rangefinder.

\* \* \* \* \*